March 8, 1966  T. N. THOMPSON ETAL  3,238,778
METHOD AND APPARATUS FOR DETERMINING TEMPERATURE OF
FREEZE DRYING MATERIAL
Filed Nov. 19, 1962

INVENTORS
TAYLOR N. THOMPSON
HAROLD R. POWELL
DOUGLAS S. FRASER

BY *J. Walton Body*
ATTORNEY

United States Patent Office 3,238,778
Patented Mar. 8, 1966

3,238,778
METHOD AND APPARATUS FOR DETERMINING
TEMPERATURE OF FREEZE DRYING MATERIAL
Taylor N. Thompson, Harold R. Powell, and Douglas S.
Fraser, New Paltz, N.Y., assignors to RePP Industries,
Inc., Gardiner, N.Y., a corporation of New York
Filed Nov. 19, 1962, Ser. No. 238,640
2 Claims. (Cl. 73—351)

This invention relates to a method and apparatus for determining temperature of freeze drying material. In freeze drying of materials, particularly where centrifugal freeze drying is employed, it becomes very important to constantly determine the temperature of the sample of material while it is being freeze dried. Conventionally the freeze drying temperatures will fall until the sample is shell frozen and as the freeze drying then proceeds the temperature will remain within allowable limits. When the freeze drying of the sample is completed the temperature then rises to approximately 80° F.

If improper temperatures are employed in this process the sample of material may be ruined and the entire freeze drying process thus becoming of no value.

In the conventional type of freeze drying apparatus it is relatively simple to determine the temperatures involved. The appropriate temperature sensing device is simply placed within the container and readings obtained as the freeze drying process is carried out.

Conventional methods of temperature determination are not available in centrifugal freeze drying because of the rapid rotation of the containers in which the freeze drying material is placed. If conventional devices are used they may shatter because of impact against the container or false readings may occur because of additional heat produced by mechanical abrasions.

In the instant invention the disadvantages set forth above are obviated in various way. In the first place the temperature sensing means are located within the container in spaced relationship with respect to the walls thereof and the spacing is sufficient to provide clearance for the free rotation of the container relative to the sensing means.

In addition, in the preferred modification of this invention, the freeze dryable material itself insulates the sensing means from the heat source used in the freeze drying process so that the temperature sensing means read the actual temperature of the freeze drying material.

The best mode known to the applicant of carrying out the instant invention is set forth in the foregoing specification but it is pointed out that the specific apparatus and method described are for illustrative purposes and for purposes of example only. Various changes and modifications may obviously be made within the spirit and scope of this invention and would occur to those skilled in this art.

The invention will be further described by reference to the drawings which are made a part of this specification.

Figures 1, 2:
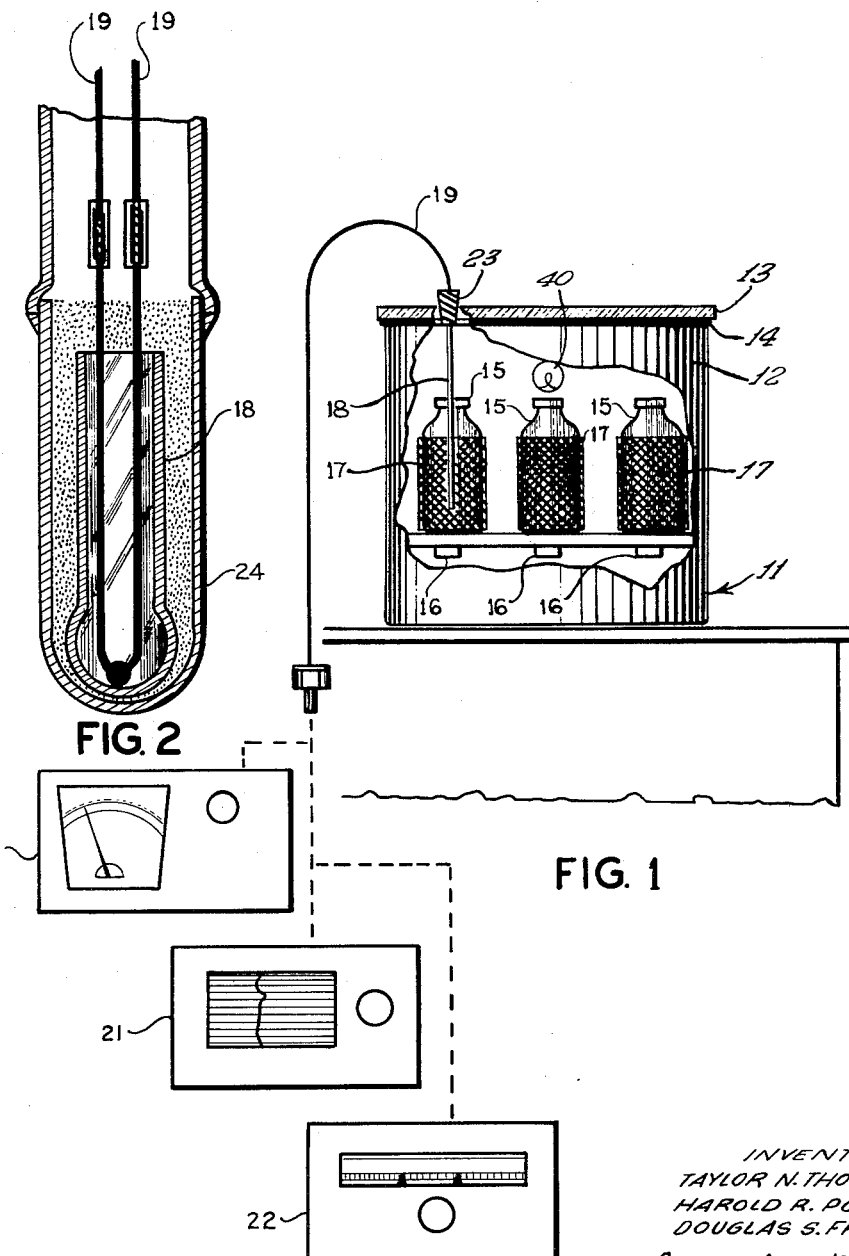
FIG. 1 is a diagrammatic front view of an apparatus which may be used to carry out the method of this invention with parts of the vacuum housing broken away to show the internal construction.
FIG. 2 is an enlarged cross-sectional view of the temperature sensing means which may be used in this invention.

The invention will now be further described by reference to the specific form thereof as shown in the drawings.

A freeze drying apparatus 11 is formed with a vacuum housing 12 containing a cover 13 sealed in place by gasket 14. Housing 12 contains a number of freeze drying containers 15 which are supported upon rotatable platforms 16 and are rotated within guards 17.

A temperature sensing probe (preferably a thermistor probe) 18 is disposed within one of containers 15 in spaced relationship with respect to the walls thereof (preferalby centrally located) the spacing provided being sufficient to provide clearance for the free rotation of the container.

A plurality of conductors 19 extend from probe 18 and optionally connected with a temperature indicating device 20, a recording device 21 or a control device 22.

Conductors 19 are secured to probe 18 within seal 23 which prevents loss of vacuum from housing 12. Shielding means 24 are provided about probe 18 to prevent shattering of the probe if it should come in contact with mechanical force.

A heat source 40 is provided in order to produce the necessary radiant heat to cause the freeze drying process to take place.

With the foregoing description the operation of this invention may now be explained.

A sample of material (not shown) is placed within containers 15 and vacuum and refrigeration means are applied to housing 12. The process is commenced at room temperature and in about five (5) minutes the temperature drops to approximately −40° F. and the product to be freeze dried is shell frozen. Since the device shown is a centrifugal freeze drying unit containers 15 are rotated and probe 18 remains in position continuously indicating the temperature of the material which is being freeze dried. When sublimation is to occur heat source 40 is activated thereby supplying radiant heat to the product. Note that probe 18 is insulated from the sublimating heat by means of the product so that an accurate reading is maintained. As sublimation occurs the temperature begins to rise and will cross the room temperature line. When the temperature reaches 80° the process must be stopped forthwith or the product will be ruined.

We claim:
1. A temperature sensing mechanism for rotating containers containing freeze drying materials comprising a vacuum housing surrounding said containers, an electrical thermistor probe extending into one of said containers and spaced from the walls thereof, said container being freely rotatable about said thermistor probe, conductor means extending from said thermistor probe outside of said vaccum housing and sealing means operatively connected to said thermistor probe.

2. An apparatus as set forth in claim 1 including shielding means about said thermistor probe.

References Cited by the Examiner

UNITED STATES PATENTS

| | | | |
|---|---|---|---|
| 1,107,737 | 8/1914 | Witham et al. | 73—351 |
| 2,482,274 | 1/1924 | Spencer | 34—15 |
| 2,068,976 | 1/1937 | Dillon | 73—351 |
| 2,355,821 | 8/1944 | Rice | 73—351 |
| 2,508,212 | 5/1950 | Ball | 165—88 |
| 2,722,716 | 11/1955 | Henning | 165—87 |
| 2,799,758 | 7/1957 | Hutchins | 73—362 |
| 2,907,117 | 10/1959 | Parkinson | 34—5 |
| 2,938,385 | 5/1960 | Mack et al. | 73—362 |
| 3,082,625 | 3/1963 | Zimmerman | 73—362 |

LOUIS R. PRINCE, *Primary Examiner.*

ISAAC LISANN, J. H. BARKSDALE,
*Assistant Examiners.*